Figure 1:
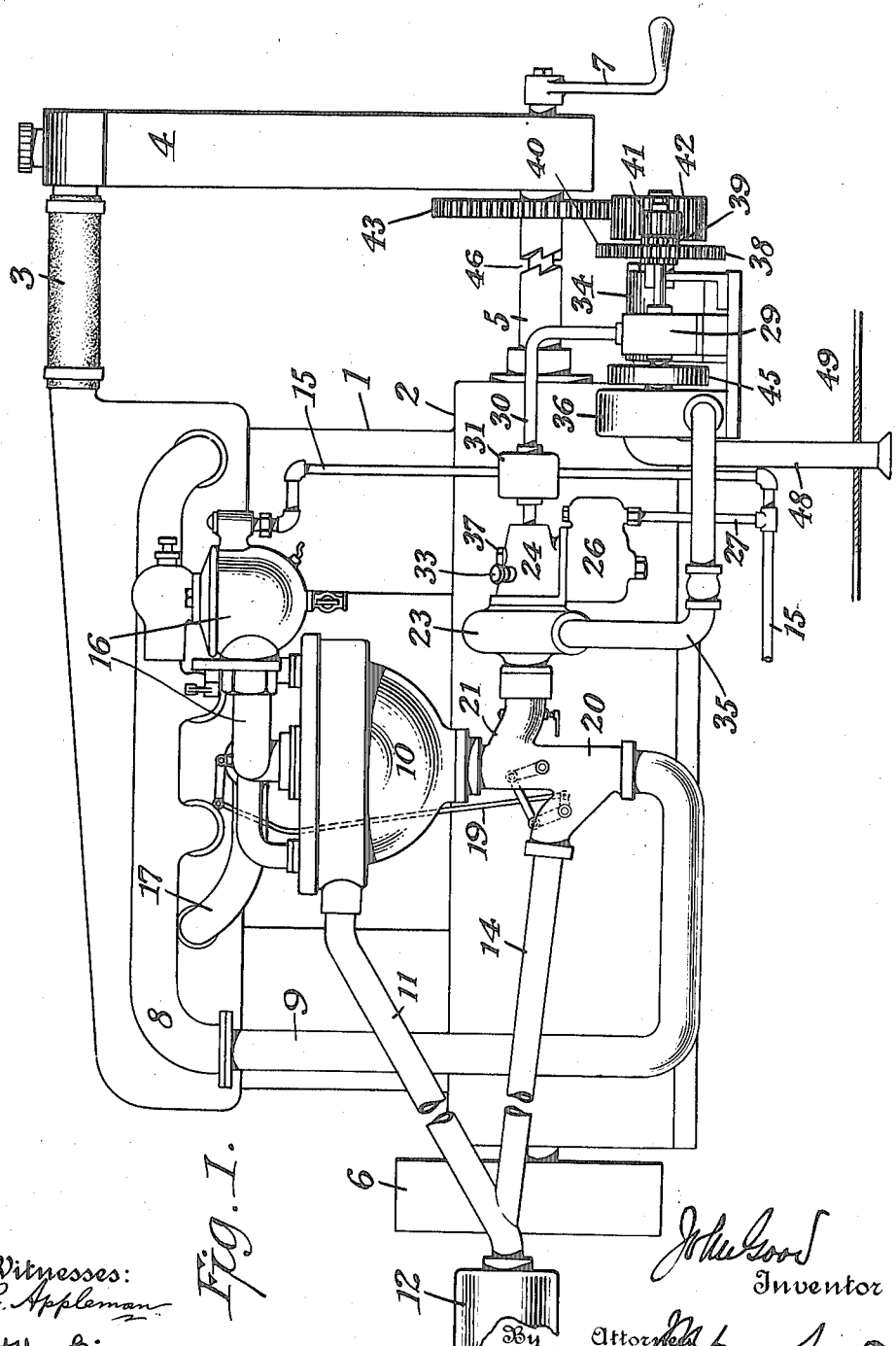

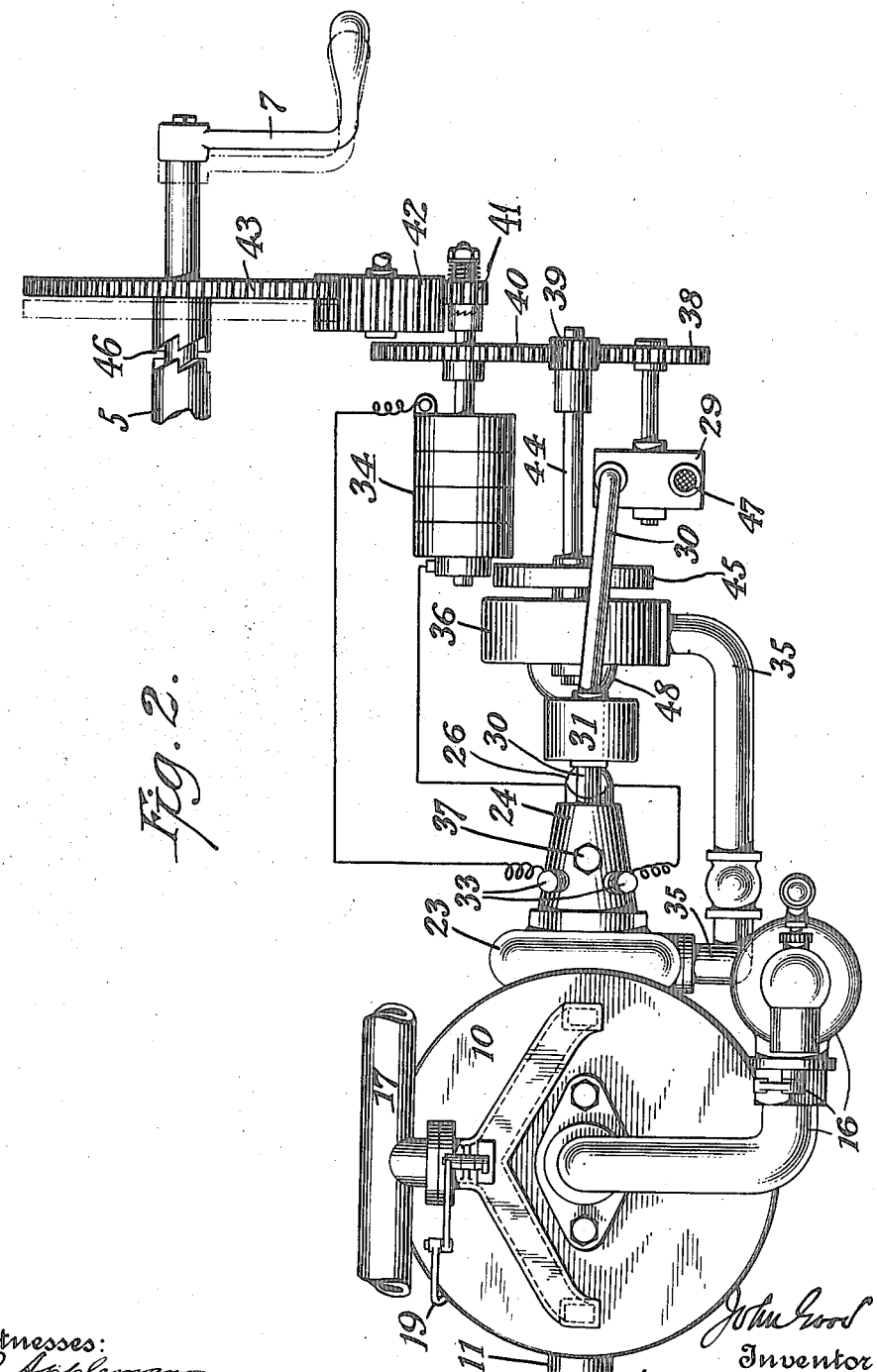

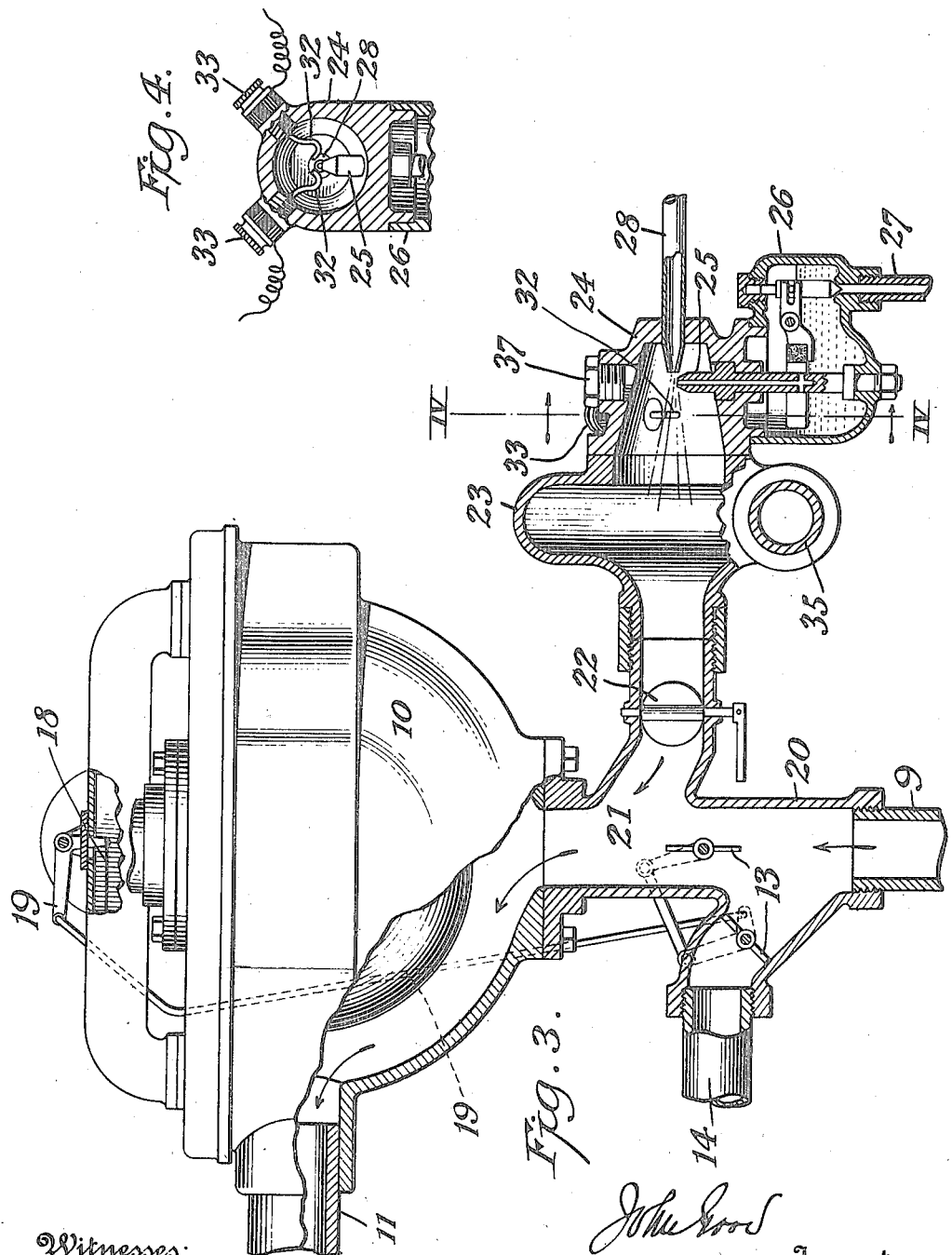

UNITED STATES PATENT OFFICE.

JOHN GOOD, OF BROOKLYN, NEW YORK.

HEATER FOR COMBUSTION-ENGINES.

1,207,897.

Specification of Letters Patent. Patented Dec. 12, 1916.

Application filed March 6, 1914. Serial No. 822,813.

*To all whom it may concern:*

Be it known that I, JOHN GOOD, a citizen of the United States, residing in Brooklyn, county of Kings, and State of New York, have invented the following Improvements in Heaters for Combustion-Engines.

The invention is a heating device adapted to burn kerosene and heavier oils and characterized by the fact that it ignites cold and burns in a confined space under pressure and high velocity and is capable of operation by simple mechanical motion for applying such degree of heat as may be necessary for preliminary heating of the vaporizer of an internal combustion engine, or other part, and principally lends itself to use in connection with automobile engines using heavy liquid fuels.

In the accompanying drawings forming part hereof, Figure 1 represents in side elevation an automobile engine equipped with one form of this invention; Fig. 2 is a plan of the several parts constituting the heating device and the part heated, on a larger scale; Fig. 3 is a still larger view in elevation and partly in section, of the parts forming the flame-confining casing of the heating device and Fig. 4 is a section on the line IV—IV, Fig. 3.

Referring to Fig. 1, the parts of the automobile engine therein shown comprise the cylinders 1, the crank casing 2, the water connections 3, radiator 4, crank shaft 5, fly-wheel 6, and a starting device 7.

The engine illustrated is assumed to be one adapted for burning kerosene or other heavy liquid fuel requiring heat for its vaporization, for which purpose the vaporizer, or some part of the vaporizing apparatus, is normally kept heated by the combustion in the engine or engine exhaust gases, which latter are taken from the exhaust manifold 8 by a pipe 9, and passed through the vaporizer or part 10 to be heated and thence to an exhaust pipe 11 leading to a muffler or other safe exhaust outlet 12. Part or all of the exhaust gases may thus be utilized as the source of heat, according to requirements, the excess gases being by-passed direct to the exhaust by the appropriate adjustment of the valves 13 through a by-pass pipe 14. The parts marked 15 and 16 are the means for introducing the fuel and air to the vaporizer, but the particular construction of these parts, and of the vaporizer, is of no consequence to the present invention and need not be described, being the subject of a separate application filed April 9th, 1914, Serial No. 830,705. The vaporized mixture enters the manifold 17 and thence passes into the several cylinders of the engine, as will be evident. A thermostat 18 is shown in the connections between the vaporizer and the manifold 17 to operate the by-pass valves 13, through its bell-crank and link connections 19, so that only such portion of the exhaust gases will traverse the vaporizer as may be necessary for its operation or to maintain a substantially uniform temperature in the vaporized mixture. In order to start such an engine, or any engine using heavy fuel oil which is vaporized by the heat of the engine's combustion process, its vaporizing agencies must be first heated until the engine is able to generate sufficient heat, by its exhaust or otherwise to assume its regular operation. For this purpose the present invention provides a flame or blast of hot combustion gases which encounters the part to be heated, and in the present case passes through a part of the path normally taken by the exhaust gases, discharging into the exhaust 12. The combustion is produced automatically as by the operation of a crank such as the crank 7, or by any source of mechanical power, as later explained, and is confined in such manner that no flame can escape where it might ignite or injure adjacent material. The flame can be admitted to the normal path of the exhaust gases at any point in the latter, either close to the cylinder heads or close to the vaporizer, as preferred, and in the present case it enters close to the heater of the vaporizer through the fitting 20, which accommodates the by-pass valves 13 above referred to. This fitting is provided with a branch passage 21 inclined toward the heater of the vaporizer and provided with a shut-off valve 22, which can be closed when necessary for the purpose of isolating the burner from the engine exhaust.

The burner or flame-generating part of the heating device is formed of two united parts 23 and 24, connected to the inclined branch pipe 21 of the fitting in such manner as to give the flame an easy entrance to the latter. The part 23 may be termed the admission chamber for the supplemental or combustion-supporting air, and the part 24 the nozzle cap, it being observed that the latter is of smaller diameter than the admission chamber, and the said parts together with the vaporizer 10 and exhaust pipe 11 form the casing or passage of the heating device in which the flame is confined. The part to be heated is thus incorporated in or within the casing of the device. The burner chamber is equipped with a liquid fuel nozzle 25, in the part 24, adapted to take liquid fuel from a float chamber 26, the latter being supplied through a pipe 27, from the fuel supply pipe 15. As will be plain without description, the fuel oil or liquid is kept at a constant level in this chamber by the float controlled admission valve therein, and the same fuel oil supply pipe supplies this chamber as supplies the engine proper. The same heavy fuel serves the heater as well as the engine. An air nozzle 28 enters the end of the burner chamber substantially axially thereof and in aspirating relation to the oil nozzle 25, and is supplied with air under pressure from a positive blower 29. The pipe 30, connecting the air nozzle with the blower, is provided with an air dome 31, so that the air jet from the nozzle 25, will have substantially constant velocity. The air-atomized fuel spray produced by the operation of the two nozzles is intercepted by the two opposing electrodes 32 of an electric igniter 33, which may be of a common type, but is here shown as formed by two separate but similar insulated plugs, mounted close to the nozzles in the casing part 24 and connected with the terminals of a magneto generator 34. A spark between the electrodes ignites the oil spray without initial or preliminary heating thereof, as presently explained. Supplemental air is supplied to the resulting flame to support combustion but at a point slightly in front of the igniting point so that it does not dilute the spray, which would prevent ignition by the igniter. The supplemental air is supplied in the present case through the annular admission chamber formed around the flame casing by the casing part 23, into which the air is tangentially delivered by the pipe 35, from a fan blower 36, having an intake extended downwardly below the drip pan 49. Entering the flame casing in this manner, the supplemental air has access to the freshly ignited spray on all sides and it is desirable that the air join the spray uniformly on all sides and without greatly distorting it. The blower 36, which may be any type of air compressor, supplies the said supplemental air, unheated, and at a lower pressure than the compressor 29, which supplies the pressure medium for atomizing the fuel, and the flame so supplied is sufficient to establish substantially complete combustion of the aspirated liquid fuel within the casing. Inasmuch as the air for aspirating the liquid fuel, as well as that for combustion, is derived from sources of higher pressure than atmosphere, it is evident that the interior of the flame casing is under pressure when the device is in operation, so that the burning gases therein are caused to flow with considerable velocity toward the open outlet thereof, being confined from escape at any other point. I have found that high velocity of said gases is desirable for quickly attaining satisfactory temperature, and this condition is promoted by the elongated or relatively narrow shape of the flame passage as well as by the air pressure. As may be observed by comparison with other parts appearing in the drawings, the diameter of the flame passage is not substantially greater than that of the exhaust gas passage, and in practice its cross-sectional area is desirably not larger than that of a circle 1½ inches in diameter, while the length of the flame may be a foot or more, depending upon the proportions of fuel and air and the air pressure. The plug 37 in the nozzle part of the burner casing is for the purpose of cleaning the oil nozzle 25, when necessary.

The magneto 34 and the air nozzle blower 29, and also the additional air-blower 36, are all arranged to be driven simultaneously so that immediately upon the establishment of an atomized fuel spray of the character above described, the igniter device 33 will be operated to ignite it. The operation of the magneto generator may be intermittent or continuous, as desired, it being noted that the first spark ordinarily ignites the spray and that the continued operation may serve no other purpose than to insure ignition under any circumstances.

Referring to the igniter, it will be observed that the described structure of the burner chamber constituted by the parts 23 and 24, provides a short space between the air admission chamber and the spray-projecting means, sufficient merely to accommodate the igniter plugs 33 in the upper wall of the nozzle cap 24, and that the electrodes 32 become thus disposed in a relatively undiluted part of the spray, that is to say, at a point slightly in rear of the main junction of the spray with the air from the air chamber 23. The forced-draft air supply from said chamber thus has initial contact with the liquid spray at a point just in advance of its point of ignition. The electrodes 32 are extended inward from the wall of the nozzle cap and have portions of them depending below their sparking points, so that the liquid kerosene collecting by impinging thereon, will drop off from the lowest parts, leaving the upstanding sparking points clean and relatively dry, which thus avoids short-circuiting of the electrodes by a drop of liquid bridging the gap. It should be explained that the position of the spark with reference to the axis of the spray and the surrounding wall of the nozzle cap, requires to be adjusted carefully in order to enable it to ignite the wet unvaporized spray of kerosene. The substantially correct position is indicated in Fig. 4, wherein it will be observed that the spark takes place somewhat off center with reference to the axis of the spray and chamber and above such axis, although directly in the path of the atomized liquid particles, as also indicated in Fig. 3. In this position ignition is established automatically and reliably.

The simultaneous operation of the nozzles and igniter is effected by connecting the operating shafts of one or both blowers and the armature shaft of the magneto generator all in a single operating system or gear train such as represented for instance by the gears 38, 39 and 40, the several speed ratios of which are of course suited for the production of the results desired and as will be evident. The gear 40 is driven by a ratchet clutch pinion 41, meshing with a long pinion 42, the latter meshing with a spur gear 43 which is driven by the member 7 or whatever device is used for starting the engine in motion. Assuming that device to be a hand crank as indicated, it is first rotated in its full line position (Fig. 2) thereby simultaneously operating the parts above described and generating a flame which warms the vaporizing apparatus to a sufficient extent to form a combustible gaseous mixture of air and the fuel used. The flywheel 45 on the shaft 44 of the fan blower assists in this operation. The crank and gear 43 are then pushed inward until the clutch member 46, on the hub of the latter, engages with the corresponding clutch member of the crank-shaft 5 and rotates the latter, whereby the engine draws in the vaporized fuel and proceeds on its normal process. As the engine takes up its own motion the clutch 46 will disengage, but the flywheel 45 will still continue the operation of the heater the ratchet teeth slipping on the pinion 41, until the exhaust from the first few charges has reached the vaporizer, the continued normal operation of the latter being thereafter assured. This overlapping of the period of operation of the heating means upon the initial period of engine operation, insures reliable starting of the engine with the minimum delay.

While I have shown a simple hand crank 7 as the means for starting the preheater and the engine, it is to be understood that the same is used in illustration of any starting device whether that be the motor-generator of a so-called electric self-starter, or other means for initially rotating the engine crank shaft, and if such starting device is an electric motor it will be evident that the current which operates it may likewise serve to operate the igniter 33 without the aid of a magneto 34 as shown in the drawings. With hand-started engines it is of course an advantage to be able to actuate the operating system of the heater at first independently of the engine, engaging later therewith when the parts have reached the working temperature, and this is permitted by the clutch 46 and sliding gear 43, operated as above described. The heavy fuel oils which require the use of vaporizers in engines do not readily ignite when used in blow torches or furnaces require to be heated preliminarly by some other agency, as is well known.

It is to be noted that the heater apparatus herein described operates efficiently on such oils and all the heavier oils commonly used for internal combustion engines, and thereby provides a means of eliminating the necessity of using special light fuel for starting the engine or for heating it or its vaporizer, and moreover provides a means of acquiring a more intense combustion and higher temperature than can be obtained by the use of open-flame blow torches heretofore employed for starting oil engines. The exhaust pipe 11 in conjunction with the muffler 12 are presumed together to constitute a path of sufficient length to discharge the combustion products at a relatively remote and perfectly safe point so as to form no hazard to an automoblie, for instance, the flame being entirely confined within the flame passage where it is safely isolated from the surrounding atmosphere or engine parts. The apparatus furthermore is extremely compact in size and thereby readily applied to existing types of engines.

It will be understood by those skilled in the art that the apparatus above described is not limited in respect of the size or proportion of its parts, nor to the details of their mechanical assemblage or construction, nor to the character of the part to be heated or the manner in which it is constructed or incorporated in the casing of the heater and that various omissions, substitutions and alterations in the form and operation of the device may be made without departing from the invention.

I claim:

1. In an internal combustion engine, the combination of means whereby the heat of the engine combustions is utilized for the vaporization of the fuel, a forced draft heating means independent of the engine combustion for heating the fuel used in the engine and comprising nozzles for atomizing fuel with air, an electric igniter in the path of the atomized fuel and means for simultaneously operating said nozzles and igniter.

2. In an internal combustion engine, the combination of fuel-vaporizing apparatus normally heated by heat developed by combustion in the engine, means for preheating such apparatus, comprising a burner chamber forming one end of a closed flame passage which includes the vaporizing apparatus and means for directing a flame from the chamber through the passage comprising a source of air pressure to support combustion, means for spraying liquid fuel of low volatility into said passage, and an electric spark igniter mounted in the path of and operable to ignite said spray.

3. In an internal combustion engine, adapted for use on heavy oils, and having means for vaporizing its fuel by the heat of its combustion, the combination of a fuel oil supply for such vaporizing means, an inclosed combustion device for preheating, said means comprising oil and air nozzles, and means for delivering oil from said oil supply also to the oil nozzle.

4. An internal combustion engine, adapted for use on heavy fuel oils and having means for vaporizing its fuel by the heat of its combustion, combined with a forced draft flame-producing device permanently applied to the said vaporizing means and including a casing to prevent escape of flame to the exterior, said casing containing a fuel spray means and an electric igniter having divergently related and self-draining electrodes directly intercepting said spray, and means for operating said device from the exterior of the casing.

5. The combination with an internal combustion engine using heavy liquid fuel and having means whereby said fuel is normally vaporized by the heat of the combustion in the engine, of an inclosed flame-producing device for heating said means, comprising a closed flame passage having an outlet for combustion products at one end and containing means at the other end for creating a blast mixture of said liquid fuel and air, ignitible in said passage in a cold state, an electric igniter for said mixture and means for supplying air to the ignited mixture in said flame passage and under pressure.

6. In an automobile internal combustion engine, means for heating the same comprising a flame-inclosing and confining casing, a burner chamber with oil and air nozzles and an igniter inclosed therein and adapted to establish a flame within the casing and a single device whereby said nozzles and igniting means may be simultaneously brought into operation.

7. The combination with an internal combustion engine provided with a normally hot vaporizing wall heated by the combustion in the engine, of independent flame-producing means for heating said wall permanently applied to the engine structure and comprising a normally closed casing preventing escape of flame and incorporating said heated wall as part thereof, and having oil and air nozzles therein adapted to project an atomized oil spray toward said wall, a supplemental air inlet, and an outlet for the combustion products at a point removed from the said heated wall, means for conducting initially unheated oil to said oil nozzle in predetermined proportion to the air delivery and means for supplying air under pressure to said casing.

8. The combination with an internal combustion engine adapted to use heavy fuel oils and having means for vaporizing its fuel by the heat of its combustion, and an exhaust pipe for the products of such combustion, of an independent flame-producing device permanently applied to the said vaporizing means and comprising a flame-confining casing with its outlet connected to said exhaust passage and having an oil nozzle and two air inlets, one of them being an air nozzle in atomizing relation to the oil nozzle, and means for supplying the said inlets with air under pressure to project flame from said nozzles through the said casing and into said exhaust pipe.

9. An internal combustion engine adapted for use on heavy fuel oils and having means for vaporizing such fuel by the heat of its combustion, combined with a forced draft flame producing device permanently applied to said engine and comprising a closed casing having an air inlet and containing a fuel spraying means and an electric igniter therefor, a current source for said igniter, suitable pressure sources for said fuel spraying means and air inlet and mechanical operating means whereby said parts establish continuous combustion in said casing.

10. In an internal combustion engine, the combination of means whereby the heat of the engine is normally utilized for the vaporization of the liquid fuel used in said engine, and heating means independent of the engine combustion for heating said fuel comprising a fuel receptacle connected to the same source of supply as the engine, nozzles for atomizing said fuel, an electric spark igniter having its electrodes directly intercepted by the spray from said nozzles and shaped to drain the impinging liquid away from the spark gap therebetween, means for supplying air under pressure to said spray, said air having contact therewith at a point where it does not dilute the same at its point of ignition and means for simultaneously operating said fuel atomizing and air supplying means at predetermined relative rates adapting the same for instant ignition and continuous combustion of the fuel in said heating means.

11. In an internal combustion engine the combination of means whereby the heat of the engine combustions is utilized for the vaporization of the fuel, a heating means independent of the engine combustion for heating the fuel used in the engine and comprising a flame confining passage closed at one end and having means at that end for discharging an atomized spray of fuel liquid through said passage, said means including a receptacle connected with said nozzle and deriving the fuel liquid from the same source as the engine, an electric spark igniter having its spark-gap disposed directly in the path of said spray and adapted to ignite the same in an initially cold condition, a supply of air pressure, an air admission chamber through which air from said supply is introduced under pressure into said passage and around the spray therein, the air stream so introduced encountering said spray in advance of said spark-gap, and means correlating the operation of said spray discharging and air supplying means and adapting the said apparatus for instant ignition and continuous complete combustion of the sprayed fuel within said closed passage.

12. In an internal combustion engine, the combination of means whereby the heat of the engine combustions is utilized for the vaporization of the fuel, a heating means independent of the engine combustion for heating the fuel used in the engine and comprising a flame-confining casing including a fuel vaporizing wall member, means for projecting an atomized spray of the fuel liquid into said casing, an electric spark igniter having its spark-gap disposed directly in the path of said spray and adapted to ignite the same in an initially cold condition, an electrical device for operating said igniter, an air blower, an air admission chamber through which air from said blower is forced into said casing, the air stream so admitted having contact with said spray where it does not dilute the same at the spark-gap, said fuel and air supplying means being mechanically connected to said electrical device for simultaneous operation to automatically produce ignition and maintain complete combustion of the liquid fuel within said closed flame casing.

13. In an internal combustion engine, the combination of means whereby the heat of the engine combustions is utilized for the vaporization of the fuel, a heating means independent of the engine combustion for heating the fuel used in the engine and comprising a flame-confining casing, means for projecting an atomized spray of fuel liquid into said casing, an electric spark igniter within the casing adapted to ignite the spray in an initially cold condition, a source of sparking current for said igniter, a supply of air pressure, an air admission chamber through which air from said supply is forced into said casing to have initial contact with the spray therein at a point beyond its point of ignition, said spray-projecting, air-supplying and current-supplying means being mechanically connected for conjoint control, and a single actuating member for operating all said means, whereby ignition and continuous combustion are automatically established in said closed casing by the manipulation of said single member.

14. The combination of an internal combustion engine having an intake passage supplied with a charge mixture of air and kerosene or like heavy fuel and means for perfecting said mixture including an engine exhaust passage in heat transferring relation to said intake passage, an inclosed flame burner mechanism in heat transferring relation to said intake passage and including a flame-confining casing incorporated in the engine structure, means for producing an atomized spray of the engine fuel in said casing, an electric spark igniter directly intercepting said spray and adapted to ignite the same in an initially cold condition, air compressor apparatus and means for delivering air therefrom into said casing, the air stream so introduced having its initial contact with said spray at a point beyond the ignition point thereof, a supply of sparking current for said igniter and mechanical connections between said fuel-spraying and air-supplying means, said connections controlling the said current supply and adapting said fuel spray for instant ignition and continuous combustion within said casing.

15. In an internal combustion engine burning kerosene and like heavy fuels, the combination with a fuel vaporizer element of such engine, of means independent of the normal engine combustion for heating said element comprising a closed flame-confining casing, means for producing an air-atomized spray of the engine fuel therein, an electric sprak igniter mounted therein directly intercepting said liquid spray and adapted to ignite the same in an initially cold condition, a supplemental air inlet to said casing, separate air compressor devices connected respectively to said spray-producing means and inlet and gearing connecting said devices and driving the same to supply air at predetermined relative rates and pressures permitting instant ignition of the fuel and adapted to maintain continuous combustion thereof within such closed flame passage.

16. In an internal combustion engine burning kerosene and like heavy fuels, the combination of means whereby the heat of the engine's combustion is utilized for vaporizing the said fuel, a forced-draft heating means for vaporizing the engine fuel comprising a closed flame-confining casing, means for producing an atomized spray of liquid fuel therein, an electric igniter therein adapted to ignite said fuel in an initially cold state, air compressing apparatus connected to said casing, a magneto generator connected to said igniter, a gear train jointly driving said air compressing apparatus and generator and means for actuating said gear train independently of the operation of the engine.

17. In an internal combustion engine burning kerosene and like heavy fuels and having a fuel vaporizer element normally heated by the engine exhaust gas, the combination of independent heating means for vaporizing the engine fuel comprising a flame-confining casing, a receptacle supplied with liquid fuel from the same source as the engine, means connected to said receptacle for projecting an atomized spray of such fuel into the casing, an electric igniter adapted to ignite such spray in an initially cold condition, air compressor apparatus connected to supply air under pressure to said casing, an actuating member whereby said compressor apparatus, fuel spraying means and igniter are simultaneously operated, and means for automatically continuing such operation coincidently with the normal heating of the said fuel vaporizer element by the engine exhaust gas, whereby the period of operation of the said independent heating means overlaps the initial period of engine operation.

18. The combination with an internal combustion engine burning kerosene and like heavy fuels and having exhaust-heated means for vaporizing such fuel, of independent heating means for said fuel comprising a closed, elongated flame-passage having a relatively remote and open exhaust outlet and closed at the other end by a nozzle cap, nozzles for spraying liquid fuel and an electric igniter for igniting such spray both carried by said cap, an annular air admission chamber forming the junction between said cap and the rest of the flame passage and of larger diameter than said cap and passage, an air blower having its delivery pipe tangentially connected to said chamber and means independent of the engine operation for operating said nozzles, igniter and compressor to automatically establish continuous forced-draft combustion in said passage.

19. An internal combustion engine burning kerosene and like heavy fuels and having means for vaporizing said fuel by the heat of its combustion, combined with a forced draft, flame producing device permanently applied to the engine and in piped connection with the liquid fuel supply thereof, and including a flame-confining casing in heat transferring relation to the intake passage of said engine, means for spraying said fuel into the casing, an electric igniter adapted to ignite said spray in an initially cold condition, a magneto generator connected to said igniter, an air blower connected to said casing and a manually operable member for simultaneously actuating said spraying means, magneto generator and air blower.

20. An internal combustion engine having a suction intake passage including a vaporizing apparatus and supplied with kerosene or like heavy fuel, said vaporizing apparatus being normally heated by the engine combustion, in combination with a forced draft, flame producing device permanently applied to the engine and including a liquid fuel receptacle supplied with the same heavy fuel as used by the engine, a closed casing confining and conducting the flame of said device into heat-transferring relation to said intake passage and beyond the same to a relatively remote exhaust opening, means for introducing air under pressure into said casing, means for introducing a spray of fuel from said receptacle into said casing, an electrical igniting means in said casing and a source of mechanical motion operatively connected to said various means to establish ignition and continuing combustion of the fuel within the casing.

21. The combination of an internal combustion engine having an intake passage supplied with a charge mixture of air and kerosene or like heavy fuel and means for perfecting said mixture including an engine exhaust passage in heat transferring relation to said intake passage, a flame-producing device having a closed casing confining and conducting said flame into heat transferring relation to said intake passage and beyond the same to a relatively remote exhaust opening, means for producing an atomized spray of the engine fuel in said casing, an electric igniter therein having its spark gap directly in the path of said spray and formed by electrodes having divergently related portions adapted to drain impinging liquid away from said gap, an electrical device for operating said igniter, air compressing apparatus connected to said casing, a source of mechanical motion and gearing connecting the same jointly to said air compressing apparatus and electrical device whereby forced-draft combustion is automatically established in said casing.

In testimony whereof, I have signed this specification in the presence of two witnesses.

JOHN GOOD.

Witnesses:
G. A. TAYLOR,
K. L. GRANT.